April 11, 1961 E. T. JENKINS 2,979,054
DOOR CONTROLLED SLIDING RACKS
Filed May 17, 1957 2 Sheets-Sheet 1

INVENTOR.
ELMER T. JENKINS
BY Charles Richard Werner
ATTORNEY

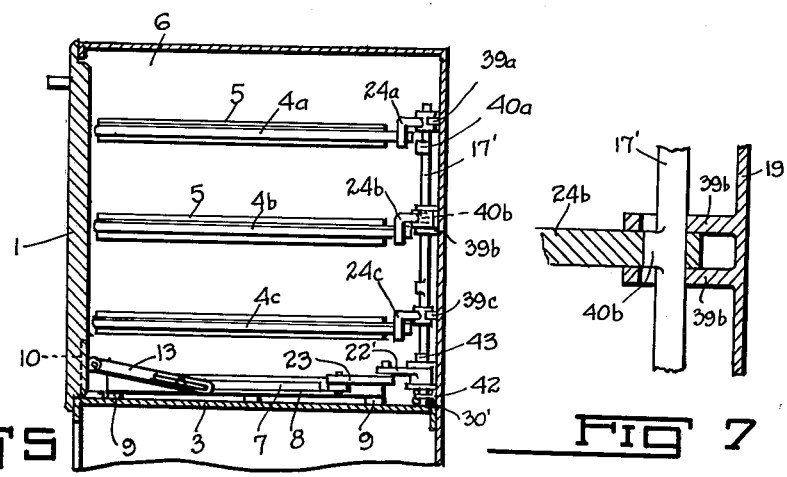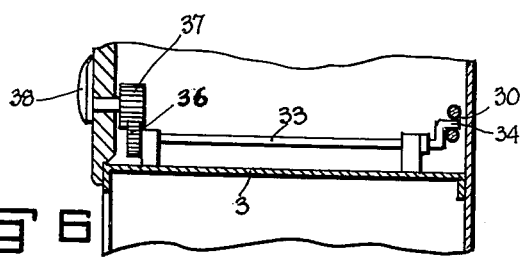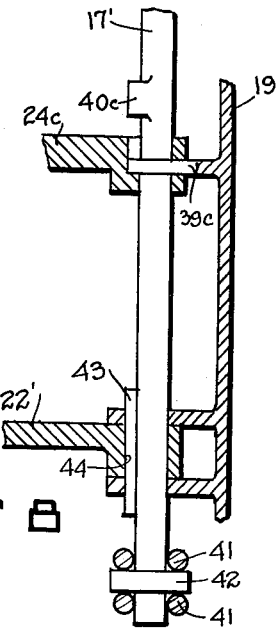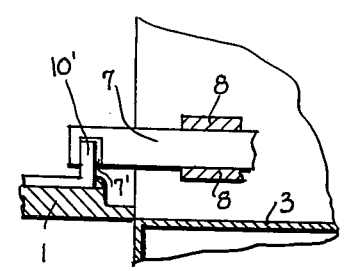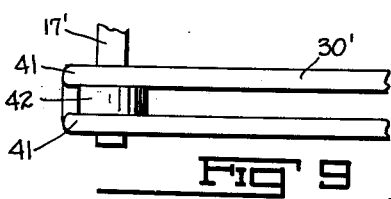

United States Patent Office 2,979,054
Patented Apr. 11, 1961

2,979,054

DOOR CONTROLLED SLIDING RACKS

Elmer T. Jenkins, 2154 N. Keystone Ave., Chicago 39, Ill.

Filed May 17, 1957, Ser. No. 659,891

11 Claims. (Cl. 126—340)

This invention relates in general to door controlled sliding racks for ovens and the like and particularly to such racks and manually controlled selective means whereby any one of several racks may be moved to extended or retracted position merely by opening or closing the oven or cabinet door.

Although this disclosure is directed toward such an arrangement in connection with an oven it is obvious that the same arrangement can be used with refrigerators or any similar device or cabinet.

In ovens, particularly, when it is desired to view or remove hot dishes of food serious burns have occurred because of carelessness in handling the sliding rack or the food therein. Also, in deep shelves or racks it is difficult to see items in the rear thereof.

For that reason I have devised a simple but effective system for sliding the racks out and in as the door of the oven or cabinet is opened or shut.

With the above in mind the objects of the invention are:

First; to provide a system of racks selectively connected to the door of the oven or other cabinet whereby opening or closing of the door will eject or retract the selected rack.

Second; to provide a delayed action in ejecting a rack when the door is opened whereby sufficient door clearance is obtained before rack ejection commences and also to permit viewing the interior without the necessity of removing the rack.

Third; to provide a positive and immediately acting connection between the door and the rack whereby retraction of a rack will commence immediately when the door is moved toward closed position, and means for disconnecting the door from the rack when the rack is fully retracted and the door continues its movement to closed position.

Fourth; to provide selector means for each rack operable from the front of the door when the door is in closed position.

Fifth; when used with four racks to provide rear manually operated selector means for each set of two racks and front door mounted selector means for selecting the particular set of racks in which rack actuation is desired.

Sixth; to provide novel means for engaging the selector means with the particular rack selected.

Other objects and advantages as well as the construction and operation of my invention will be apparent by reference to the following specification in connection with the accompanying drawings in which:

Fig. 5 is a side vertical sectional view through a modified form of my invention in which three racks and supports are used.

Fig. 6 is a fragmentary view partly in section, of the rack selecting lever and associated mechanism.

Fig. 7 is an enlarged fragmentary sectional view of the center rack vertical rod and lever.

Fig. 8 is a similar view of the lower rack lever and vertical rod actuating arm.

Fig. 9 is another fragmentary view of the vertical rod and actuating arm.

Fig. 10 is a fragmentary view of a modified form of slide bar actuating leg on the oven door.

Figure 1:
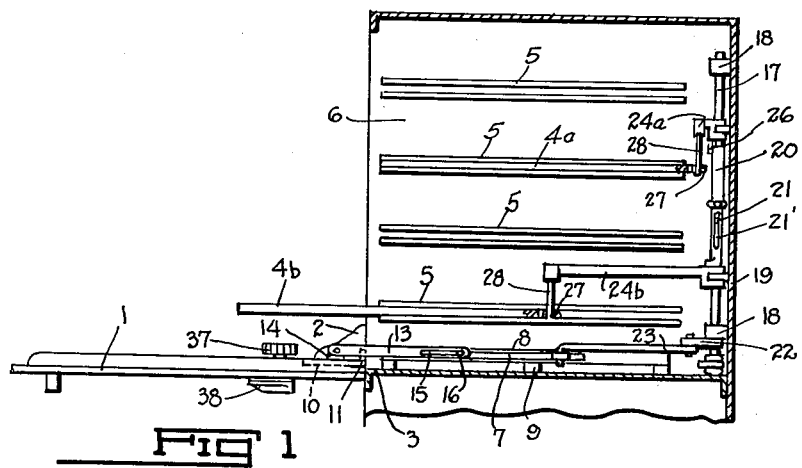
Fig. 1 is a side vertical sectional view through an oven with my invention installed, parts being shown in elevation.
Figure 2:
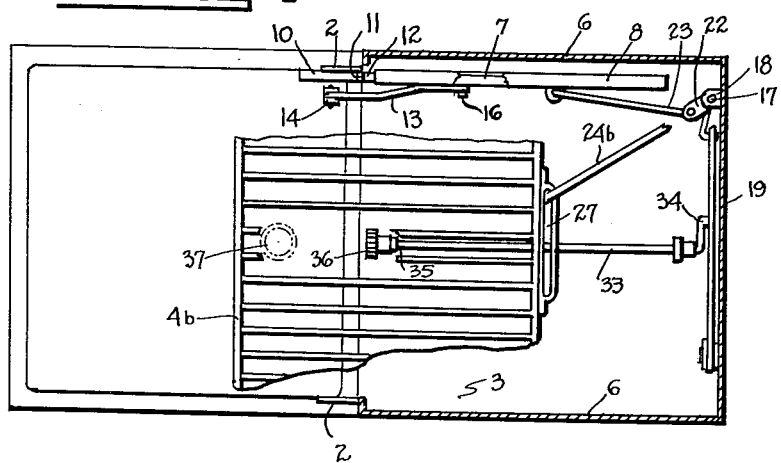
Fig. 2 is a top view of the same, partly in section and partly in elevation.
Figure 3:
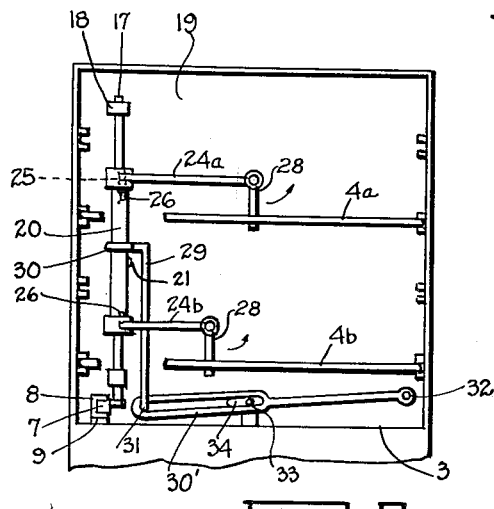
Fig. 3 is a front view of the same.
Figure 4:
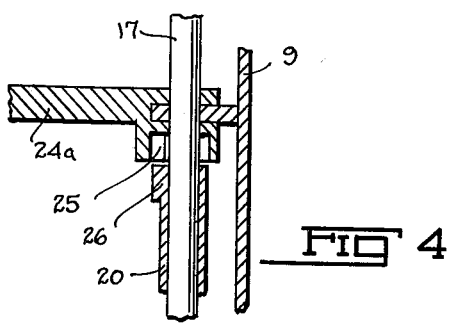
Fig. 4 is an enlarged fragmentary detailed view of the support and the engaging structure for a rack actuating arm.

Referring now to the drawings by numerals of reference, 1 designates an oven door suitably hinged at 2 to the oven frame or bottom 3. Racks 4a and 4b are mounted for sliding movement in guides 5 on side walls 6.

A slide bar 7 is carried in track 8 preferably supported by legs 9 on bottom 3, although said track could be carried on one of the side walls 6. However, mounting of the track on the bottom will permit easy removal of the detachable bottom together with the track for cleaning or for servicing the bottom heating element on electric stoves.

A contact arm 10 is secured flush with the inner face of the door 1, the angular leg 11 of the arm maintaining contact with end 12 of the slide bar 7 when the door is fully open and during a portion of the travel of the door toward closed position as explained hereinafter.

A rod 13 is hinged to bracket 14 on door 1, the other end of the rod being slotted at 15 where it connects to a pin 16 on slide bar 7. The slot 15 provides for a partial opening of the door without actuation of the slide bar 7 thus permitting viewing of the contents of the oven without rack actuation. Further opening of the oven door will cause rod 13 to move slide bar 7 outwardly. Upon closing of the door 1 angular leg 11 will return the slide bar 7 rearwardly and will disengage from the slide bar when the door is about one-half closed, the rack having been fully retracted by this time.

In one form of my invention I provide a vertically mounted rod 17 in suitable supports 18 carried on rear wall 19 of the oven. A sleeve 20 is mounted for vertical movement on the rod 17. A lug 21 on the rod 17 is adapted to engage a vertical slot 21' in the sleeve 20 whereby the sleeve may move freely vertically but will at all times be in rotative engagement with the rod 17.

An arm 22 extends from the bottom end of rod 17 to the end of an arm 23, the other end of which is pivoted to the slide bar 7 whereby movement of the slide bar will impart pivotal movement to the rod 17 and sleeve 20.

Arms 24a and 24b are normally supported for pivotal movement about sleeve 20 and each arm has a notch or slot 25 in which corresponding lug 26 on the vertically movable sleeve 20 may engage whereby pivotal movement of the sleeve will impart pivotal movement to the arm which is engaged by the lug 26.

A slotted member or track 27 is secured to the rear end of each rack 4a, 4b, etc., and each arm 24a and 24b has an adjustable finger 28 which may be manually shifted for engagement with a rack in the upper or lower level of each guide, the rack having been moved manually to the desired guide.

For primary selection of racks I have provided means for raising or lowering the sleeve 20, said means comprising an offset arm 29 operating in annular groove 30 in the sleeve whereby the sleeve can pivot on the arm but must move vertically therewith. The lower end of arm 29 engages slotted lever 30' at 31, lever 30 being pivoted at one end 32 to rear wall 19 of the oven so that it can be raised or lowered. To actuate the slotted lever 30' I provide a control shaft 33 mounted on the bottom 3, the rear end of the shaft having a crank 34 engaging the slotted lever 30' to raise and lower same, the crank being adapted to go passed dead center to lock the crank in adjusted position.

The front end 35 of shaft 33 may be provided with a sharp toothed gear 36 adapted to engage a similar gear 37 on a shaft passing through the door 1 and terminating in a knob 38 mounted on the front of the door for easy operation.

In the modified form of my invention shown in Figs. 5 to 9 where three racks 4a, 4b and 4c are shown, the rod 17' is movable vertically in supports 39a, 39b and 39c, said supports also retaining pivoted rack arms 24a, 24b and 24c in fixed vertical position.

Lugs 40a, 40b and 40c are provided on the vertical rod 17', each lug being definitely related to its respective rack arm whereby only one arm can be engaged at a time by a lug. As shown with the rod 17' in central position, the center rack arm 24b is engaged, and the other two rack arms are disengaged.

Raising the rod 17' a predetermined distance will disengage the center rack arm 24b and will cause lug 40a to engage rack arm 24a while lower lug 40c remains disengaged from lower rack arm 24c. In lowering the vertical rod 17' to bottom position lug 40a will disengage from rack arm 24a and lug 40b will pass entirely through rack arm 24b while lower lug 40c will engage rack arm 24c, thus providing complete and independent rack selection.

The slotted lever 30' has a double slotted end 41 in which collar 42, fixed to the lower end of vertical rod 17' will operate, providing complete pivotal freedom to the collar and rod 17' while it is in fixed relation to the lever 30' for raising and lowering movement thereof. Lever 30' is controlled in the same manner as lever 30 of the first described form of my invention.

For rotative movement of the vertical rod 17' I have provided an additional lug 43 adapted to mesh continuously with slot 44 in arm 22' connected to arm 23 pivoted to slide 7 in guide 8.

The modified form of slide bar actuator shown in Fig. 10 shows a contact arm 10' on the oven door which engages notch 7' in the slide bar 7 and remains engaged until the rack has reached its fully detracted position, the oven door being partially open at this point. The arm 10' will disengage and the oven door can be closed. When opening the door the rack will not be actuated until the door is partially open and the arm 10' has engaged the notch 7'.

My invention may be formed with slight variations for use with two or more racks in two or more guides, the same general principles of construction and operation being employed.

From the foregoing it will be seen that I have provided several forms of oven door controlled racks which, insofar as I am aware are far simpler and more economical to construct, as well as more efficient in operation, than any similar device shown in the prior art.

Obviously, changes in form, proportion and details of construction may be resorted to without departing from the spirit of my invention and I reserve all rights to such changes as come within the scope of these specifications and the claims which follow.

What I claim as new and desire to secure by Letters Patent is:

1. In combination with an oven and its hinged door, a plurality of rack guides in vertical disposition within the oven, a plurality of racks in their respective guides, a rack selecting and actuating means including a vertical rack actuating rod, connecting arms between the vertical rod and the racks, means for selectively connecting the vertical rod to any one of the arms, and means connected to the oven door for pivotally moving the vertical rod to actuate a selected arm and rack upon movement of the oven door.

2. In combination with an oven and its hinged door, a plurality of rack guides in vertical disposition within the oven, a plurality of racks in their respective guides, a rack selecting and actuating means including a vertically fixed rack actuating rod, a vertically movable sleeve on the rod, connecting arms between the vertical rod and the racks, means for selectively connecting the vertically movable sleeve to any one of the arms, and means connected to the oven door for pivotally moving the vertical rod and sleeve to actuate a selected arm and rack upon movement of the oven door.

3. In combination with an oven and its hinged door, a plurality of rack guides in vertical disposition within the oven, a plurality of racks in their respective guides, a rack selecting and actuating means including a vertical rack actuating member, a connecting pivotal arm between the vertical rack actuating member and each rack, means for selectively connecting the vertical rack actuating member to any one of the pivotal arms, and means including the oven door for pivotally moving the vertical rack actuating member to actuate a selected arm and rack when the oven door is actuated.

4. In combination with an oven and its hinged door, a plurality of rack guides in vertical disposition within the oven, a plurality of racks in their respective guides, a rack selecting and actuating means including a vertical rack actuating member, a connecting arm between the vertical rack actuating member and each pair of racks, manually adjustable means at the end of each connecting arm for selecting one or the other rack in each pair of racks, means for selectively connecting the vertical rack actuating member to any one of the arms, and means including the oven door for pivotally moving the vertical rack actuating member to actuate a selected arm and rack when the oven door is actuated.

5. The structure as specified in claim 3, said means for selectively connecting the vertical rack actuating member to one of the arms comprising a lever arm pivotally supported at one end, the other end of the lever arm engaging the vertical rack actuating member, a rack selector rod extending transversely from the lever arm, a crank at one end of the selector rod in engagement with the lever arm, and means for moving the selector rod and crank to any desired rack selecting position.

6. The structure as specified in claim 3, said means for selective connecting the vertical rack actuating member to one of the arms, comprising a lever arm pivotally supported at one end, the other end of the lever arm engaging the vertical rack actuating member, a rack selector rod extending transversely from the lever arm, a crank at one end of the selector rod in engagement with the lever arm, a toothed member on the end of the selector rod remote from the crank, a second toothed member on the oven door adapted to mesh with the first toothed member when the oven door is closed, and a control knob on the outside of the oven door connected with the second mentioned toothed member for external rack selection when the oven door is closed.

7. The structure as specified in claim 3, said last-named means including a slide bar extending from a point adjacent the front of the oven and extending toward the rear of the oven adjacent the lower end of said oven, a contact arm on the oven door adapted to engage one end of the slide bar during a portion of the arcuate travel of the oven door, a rod pivoted at one end to the oven door and having a slot at the other end thereof, a pin in the slide bar engaging the slot in the rod, an arm pivotally secured at one end to the slide bar, a short arm secured to the lower end of the vertical rack actuating member and pivotally engaging the other end of the arm pivotally secured to the slide bar.

8. The structure as specified in claim 7, said vertical rack actuating member being vertically movable with respect to the short arm and in continuous, rotative engagement therewith.

9. The structure as specified in claim 3, said last-named means including a contact arm on the oven door, a slide bar extending rearwardly from adjacent the oven door and operatively connected to the vertical rack actuating member, a notch at the forward end of the slide bar, said contact arm engaging the notch after the oven door has been opened a predetermined distance to move a selected rack to fully extended position when the oven door is fully opened.

10. In combination with an oven and its hinged door, a plurality of rack guides in vertical disposition within the oven, a plurality of racks in their respective guides, a rack selecting and actuating means including a vertically and pivotally movable rack actuating member, means for imparting vertical movement to the vertical rack actuating member to selectively connect said vertical rack actuating member to any one of the racks, and means connected to the oven door for pivoting the vertical rack actuating member to actuate the selected rack, both vertical and pivotal movement of the vertical rack actuating member accomplishing rack selection and ejection respectively.

11. In combination with an oven and its hinged door, a plurality of rack guides in spaced vertical disposition within the oven, a plurality of racks each in its respective guide, a rack selecting and actuating means including a vertically disposed rack actuating member, a plurality of connecting arms each positioned between its respective rack and the vertical rack actuating member, means for selectively connecting the vertically disposed rack actuating member to any one of the connecting arms, said vertically disposed rack actuating member comprising a vertical rod mounted for rotative movement and in fixed vertical relation to the racks, said last-named means including a sleeve member on the vertical rod rotatable with the rod and vertically slidable thereon, a sleeve actuator member having one end pivotally supporting said sleeve and fixed in vertical relation thereto, a lever arm pivotally supported at one end, the other end of the sleeve actuator member being pivotally secured to the other end of the last-mentioned lever arm, said last-named means including manual means for moving the lever arm to actuate the sleeve for rack selection.

References Cited in the file of this patent
UNITED STATES PATENTS

| | | |
|---|---|---|
| 355,180 | Kuehnle | Dec. 28, 1886 |
| 429,380 | Gilbert | June 3, 1890 |
| 565,477 | Linton | Aug. 11, 1896 |
| 688,639 | Harton | Dec. 10, 1901 |
| 1,487,950 | Kimmerle | Mar. 25, 1924 |
| 1,507,778 | Keavey et al. | Sept. 9, 1924 |
| 1,560,847 | Parke | Nov. 10, 1925 |
| 1,777,529 | Nelder | Oct. 7, 1930 |
| 1,851,183 | Hill | Mar. 29, 1932 |
| 1,894,268 | Forsyth et al. | Jan. 17, 1933 |
| 2,049,237 | Wertzheiser | July 28, 1936 |
| 2,073,240 | Kahn | Mar. 9, 1937 |
| 2,255,129 | Rogers | Sept. 9, 1941 |
| 2,829,022 | Lewis | Apr. 1, 1958 |

FOREIGN PATENTS

| | | |
|---|---|---|
| 769,890 | France | June 18, 1934 |